United States Patent [19]

Haug

[11] Patent Number: 4,881,244

[45] Date of Patent: Nov. 14, 1989

[54] TRANSMISSION-RECEPTION EQUIPMENT FOR A BUS SYSTEM

[75] Inventor: Friedrich Haug, Munich, Fed. Rep. of Germany

[73] Assignee: Siemens Aktiengesellschaft, Berlin and Munich, Fed. Rep. of Germany

[21] Appl. No.: 131,746

[22] Filed: Dec. 11, 1987

[30] Foreign Application Priority Data

Dec. 11, 1986 [DE] Fed. Rep. of Germany ....... 3642374

[51] Int. Cl.$^4$ .................. H04B 3/00; H04L 25/00
[52] U.S. Cl. .................................. 375/36; 375/121; 307/270
[58] Field of Search .............. 375/36, 121; 370/42, 370/85, 15, 80; 307/260, 270, 446, 448; 340/825.03; 178/2 R

[56] References Cited

U.S. PATENT DOCUMENTS

| | | | |
|---|---|---|---|
| 3,465,101 | 9/1969 | Christian et al. | 375/36 |
| 3,875,332 | 4/1975 | Fletcher et al. | 375/36 |
| 4,254,501 | 3/1981 | Griffith et al. | 370/85 |
| 4,337,465 | 6/1982 | Spracklen et al. | 340/825.03 |
| 4,445,222 | 4/1984 | Smitt | 307/270 |

FOREIGN PATENT DOCUMENTS 0171555 2/1986 European Pat. Off. .
2570563 3/1986 France .

Primary Examiner—Robert L. Griffin
Assistant Examiner—Stephen Chin
Attorney, Agent, or Firm—Hill, Van Santen, Steadman & Simpson

[57] ABSTRACT

Transmission-reception equipment for a bus system guarantees a reliable response of all bus receivers in a bus system preferably constructed with a shielded twisted-pair cable and having a greater length and/or higher bit rate than prior art systems. The stations are coupled to the bus system via a repeater having a primary winding and a secondary winding having the same number of turns. Two bus transmitters are connected parallel to one another and are respectively connected to the primary winding halves separated by a resistor. The bus reception equipment is connected to a series circuit of the two primary winding halves, whereas the secondary winding is connected to the signal conductors of the bus system. A voltage doubling achieved in the transmission direction is thereby not cancelled in the reception direction.

12 Claims, 3 Drawing Sheets

TRANSMISSION-RECEPTION EQUIPMENT FOR A BUS SYSTEM

BACKGROUND OF THE INVENTION

For a fast exchange of digital signals between frequently changing remote stations, for example between telecommunications terminals, between computers serving for data processing or even between exchange-oriented processors, bus systems are frequently employed in which the respectively connected stations have random access to the bus system via transmission and reception equipment. The digital signals thereby emitted from a station are transmitted on the bus toward both sides and, based on decoding of preceding addresses, are only accepted by the station or stations identified by the address or addresses. What is referred to as CSMA/CD (carrier sense multiple access with collision detection) has gained particular significance for the control of access to the bus system; before a station begins to send, it listens on the bus to see whether a transmission event is already occurring there. When there is a transmission event, the station initially waits for the end thereof; the station then begins to send, whereby it initially continues to listen until it is certain, after a defined time span (round trip delay time), that all other stations have received its sending. When another station has begun to send roughly simultaneously in the same way, then the two stations will identify a collision of their digital signals with those of the respective other station, whereupon they will respectively abort their transmission operation in order to begin therewith a new transmission after a random time span.

A simple method with which a multiple transmitting can be identified is as follows. The active station compares the signal it is now to output to the signal statuses prevailing at its reception equipment connected to the bus system, whereby a signal status difference then indicates a collision. The recognition of such a signal status difference assumes that one signal status can always physically prevail over the other signal statuses (given binary signals) on the bus system. Regardless of the number of transmitters which are active roughly simultaneously, this signal priority must thereby also be guaranteed given great line lengths of more than 100m for every station.

A bus system (disclosed by EP-A1-017155) has two signal conductors having transmission equipment respectively connected thereto via two difference outputs and having two signal statuses one of which effects a dominance signal status in the bus system and for the other of which the appertaining transmission equipment leaves the two signal conductors at least approximately unloaded. The two difference outputs at the transmission equipment respectively formed with the bus transmitters has two difference outputs connected to the two signal conductors via two mutually opposite diodes situated in their inhibited condition in the other signal status.

This prerequisite is not met by currently commercially available standard transmitters having two difference outputs for a bus system having two signal conductors. Given such bus transmitters which are usually switched into a third, quiescent condition (tri state) in times of inactivity, i.e., outside of the bit time spans of transmitted bits, opposed signal statuses which can lead to signal falsifications or to transmitter damage due to overload can be avoided in this quiescent condition given clock-controlled or access-controlled bus systems. Given a random access bus system, the access control is based on opposing signal statuses occurring, however, such opposing signal statuses may not be recognized at all under certain conditions given the utilization of ordinary standard bus transmitters for great line lengths between stations lying far apart. The opposing signal statuses may be overlooked due to the voltage drop along the bus.

This bus system, which assumes a galvanic coupling of the transmission-reception equipment to the two signal conductors, guarantees a uniform signal status in the bus system and, thus, increased reliability in the recognition of a collision of transmitters given simultaneous access of the bus, guaranteeing this independently of the distance between and the of the number of transmitters active roughly simultaneously. Also, avoided is an overload of the sender outputs given opposite signal statuses.

Given bus systems having greater line lengths as required in local area networks (LAN), the line atenuation and the power used by subscriber stations along the bus lead to a considerable reduction of the signal amplitudes. This respectively limits the maximum allowable line length for a specific data rate and number of subscribers.

Fundamentally, the maximum allowable line length can be increased by utilizing a bus cable having an enlarged conductor cross section and, thus, having reduced atenuation. In a corresponding expansion of a bus system already installed, however, this requires a replacement of the previous bus cable by a corresponding, new bus cable, or, for a new installation of a bus system, requires a larger bus cable from the very offset, even when the initial extent of the bus system would not even make such a large cable necessary.

The present invention discloses a novel bus system having increased maximum allowable distance between subscriber stations.

SUMMARY OF THE INVENTION

The present invention is directed to a transmission-reception equipment for a bus system having two signal conductors, having a difference bus terminal equipment connected to the signal conductors via difference outputs and capable of two signal statuses. A difference bus reception equipment has two difference inputs connected to the signal conductors. This transmission-reception equipment is inventively characterized in that a repeater is provided and has a primary winding subdivided into two at least approximately identical halves and has a secondary winding having at least approximately the same number of turns as the primary winding and having its two ends connected to the two signal conductors. The two ends of the first primary winding half are connected to the two difference outputs of at least one first difference bus transmitter. The two ends of the second primary winding half are connected to the two difference outputs of at least one second difference bus transmitter having its input side connected parallel to the first difference bus transmitter. The two ends of the two primary winding halves farthest opposed from one another are connected to at least one difference bus receiver, and a resistor is connected between the two adjacent center ends of the two primary winding halves. The value of resistance of the resistor is high in comparison to the bus transmitter output resistance and is low in comparison to the bus receiver input resistance.

With a doubling of the transmission voltage a transmitting subscriber station couples into the bus system without a simultaneous halving of the reception voltage effective in a non-transmitting subscriber station. The present invention produces the advantage of an increased maximum allowable length of a bus system and/or of an increased allowable data rate merely with station-associated means, without performing operations on the bus cable itself.

In a further development of the present invention, two first difference bus transmitters are connected parallel to one another at their input and output sides and two second difference bus transmitters are connected parallel to one another at their input and output sides. These transmitters are provided in order to avoid a reduction of the signal amplitude due to the transformation of the load resistance at the primary side of the repeater as a result of the square of the transmission ratio.

Advantageously, the subscriber stations are transformers coupled to the bus system via a transmission-reception equipment which can also can have an access control according to the CSMA/CD method. Accordingly, in a further development of the invention, difference bus transmitters at the transmission side are respectively unlocked for only a fraction of a bit time span, particularly for about one-fourth of a bit time span, after every level transition of the respectively supplied transmission data and thereby output a positive or negative difference voltage pulse dependent on the new signal level. These difference bus transmitters being in a quiescent condition of high internal resistance (tri-state condition) in the remaining part of every bit time span, particularly for about three-fourths of a bit time span. Two difference bus receivers in the reception side are connected in mutually opposite directions to those ends of the two primary winding halves farthest opposed from one another. A bi-stable RS flip-flop has its two inputs connected to the outputs of the two difference bus receivers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
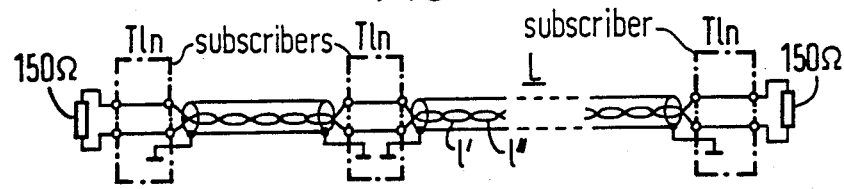
FIG. 1 is a schematic bus system having connected subscriber stations.

FIG. 1 of the drawings schematically shows a serial bus system L having two signal conductors $1'$, $1''$ and a line shield (ground); such a bus system can be preferably realized with a shielded cable (twisted pair cable) having two twisted leads and having a characteristic impedence of, for example, 150 Ohms, for example a cable 2Y(St)Y1×2×0.5/2.2−150, whereby the two twisted leads form the two signal conductors $1'$, $1''$. Subscriber stations T1n are connected to the bus system L, each being connected thereto via transmission-reception equipment, as may be seen in greater detail in FIG. 2.

Figure 2:
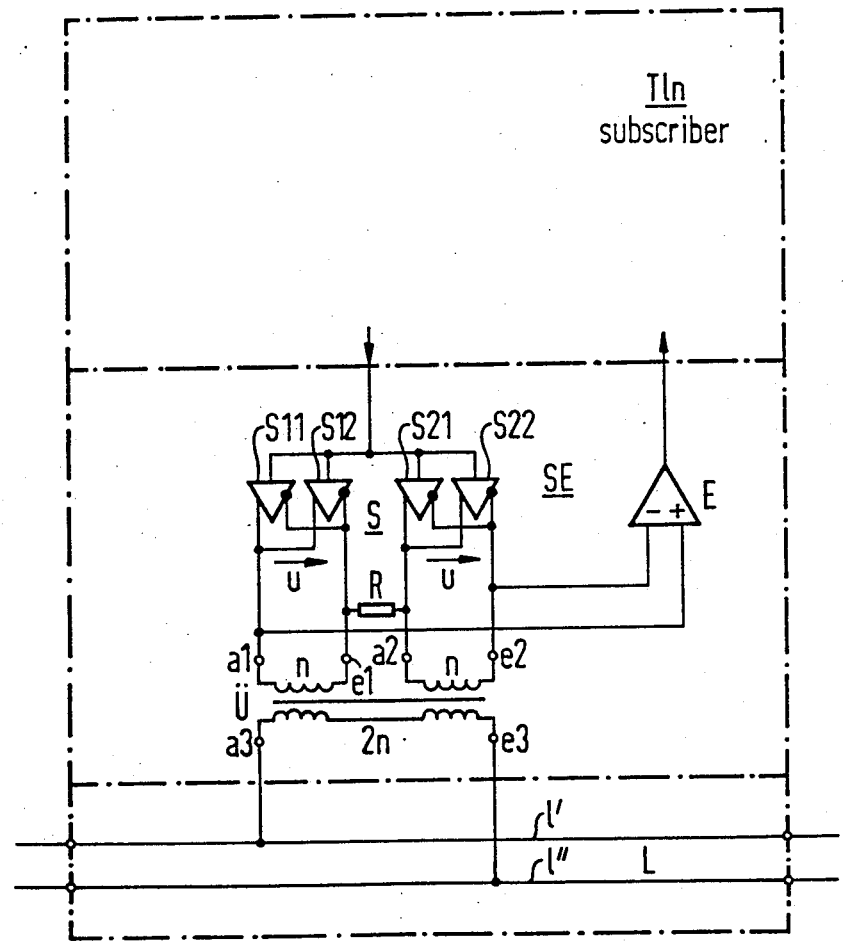
FIG. 2 is a block diagram of circuit details of the transmission-reception equipment of the FIG. subscriber station.

According to FIG. 2, such a subscriber station T1n can be used in a telecommunications terminal equipment, a computer or an exchange processor. The station T1n has a transmission-reception equipment SE having two first difference bus transmitters S11, S12 connected parallel to one another at the input and output sides and two second difference bus transmitters S21, S22 connected parallel to one another at the input and output sides, has a difference bus receiver E and a repeater (or, transformer) 10. The repeater has a primary winding n—n subdivided into two at least approximately identical halves and has a secondary winding 2n having an at least approximately identical number of turns as the primary winding n—n which has its two ends a3, e3 connected to the two signal conductors $1'$, $1''$. The two ends a1, e1 of the first primary winding half are connected to the two difference outputs of the two first difference bus transmitters S11, S12, and the two ends a2, e2 of the second primary winding half are connected to the two difference outputs of the two second difference bus transmitters S21, S22. The two ends a1, e2 of the two primary winding halves farthest opposed from one another are connected to the bus receiver E. A resistor R is connected between the two center adjacent ends e1, a2 of both primary winding halves facing toward one another. The value of resistance of the resistor R is high in comparison to the output resistance of the bus transmitter and is low in comparison to the input resistance of the bus receiver.

What is achieved by the specified relationship of the resistance of the resistor R and the output resistance of the bus transmitters is that the transmission voltages u outputted by the difference bus transmitters connected to the two primary winding halves are transmitted to the secondary side of the repeater 10 associated with the primary winding half, i.e., in parallel and, thus, are coupled into the bus system L with doubled voltage amplitude corresponding to the transmission ratio n:2n. Also, the parallel effect of the two primary winding halves and of the difference bus transmitters connected thereto produces in the transmission direction a halving of the internal resistance effective at the transmission side.

When, as also shown in FIG. 2, exactly two difference bus transmitters S11, S12 or, respectively, S21, S22 connected parallel to one another are provided for each primary winding half, another halving of the internal resistance effective at the transmissions side is effected, so that the transformation of the bus load resistance from the secondary side of the repeater 10 to the primary side thereof effected with the square of the transmission ratio 2n:n is compensated. The total of four difference bus transmitters S11, S12, S21, S22 thereby requires practically no added outlay since commercially available bus transmitter modules, for instance type SN74ALS1631, already contain four such bus transmitters.

In the reception direction the specified relationship of resistance of the resistor R and the input resistance of the bus receiver results from the fact that the two primary winding halves take effect in their actual series circuit and the signal voltages incoming on the signal conductors 1', 1" of the bus system L are transmitted to the bus receiver E with the transmission ratio 1:1. Since, in the final analysis, the voltage doubling achieved in the transmission direction is thus not in turn cancelled by a voltage halving in the reception direction, it can be assured that every receiver still receives the signal voltages with an amplitude enabling a reliable response, even given a bus system that is relatively long with, for example, a cable length of 300m and thereby loaded, for example, by 16 subscriber stations.

The individual difference bus transmitters S11, S12, S21, S22 are expediently unlocked only for a fraction of a bit time span after every level transition of the supplied transmission data. They output a positive or negative difference voltage pulse u dependent on the new signal status. Such difference bus transmitters can be realized with tri-state bus transmitters of a bus transmitter module, for example type SN74ALS1631 (T1) which also has a quiescent condition as a third condition in addition to two signal statuses. These tri-state bus transmitters have their unlocking inputs supplied with an unlocking pulse respectively lasting only a fraction of a bit time span, being supplied therewith after every level transition of the transmission data adjacent at the transmission data input of the difference bus transmitters. Such unlocking pulse can be derived from the transmission data, for example with the assistance of two monostable circuits, for instance type 74LS123, activated for a level transition of the one or, respectively, of the other operational sign, as referenced MK in FIG. 3.

Figure 3:
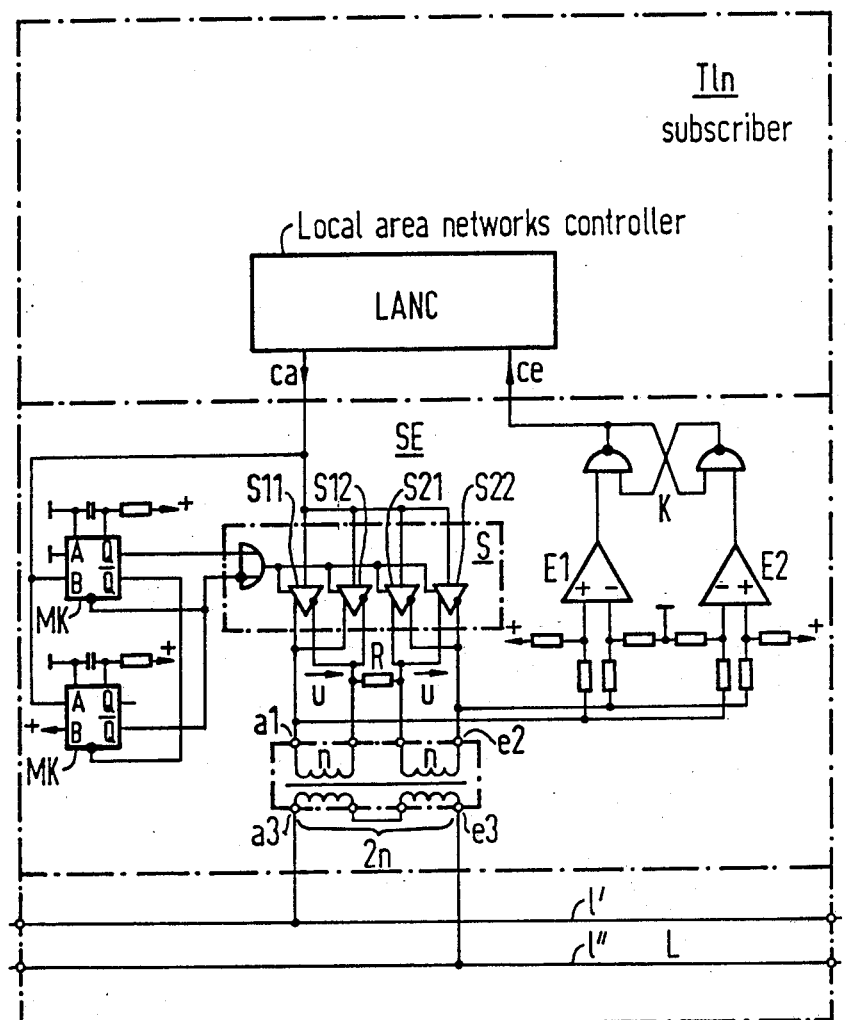
FIG. 3 is a further circuit of a preferred exemplary embodiment of a transmission-reception equipment of the invention.

As likewise shown in greater detail in FIG. 3, two difference bus receivers E1, E2 (for example, type SN75173) connected oppositely to one another to the repeater U and to the signal conductors 1', 1" via the latter are provided at the reception side. These receivers E1, E2 have their output side connected to an S-input or, respectively, R-input of a bi-stable RS flip-flop K which, according to FIG. 3, can be realized with two cross-coupled NAND elements 12, 14, for example type SN74ALS00. In the subscriber station T1n depicted in FIG. 3, the reception data input ce of a LAN controller LANC (for example, type 82588) is connected to the output 16 of the RS flip-flop K, the transmission data output ca of this LAN controller LANC is connected to the transmission data input 18 of the difference bus transmitters S11, S12, S21, S22.

Figure 4:
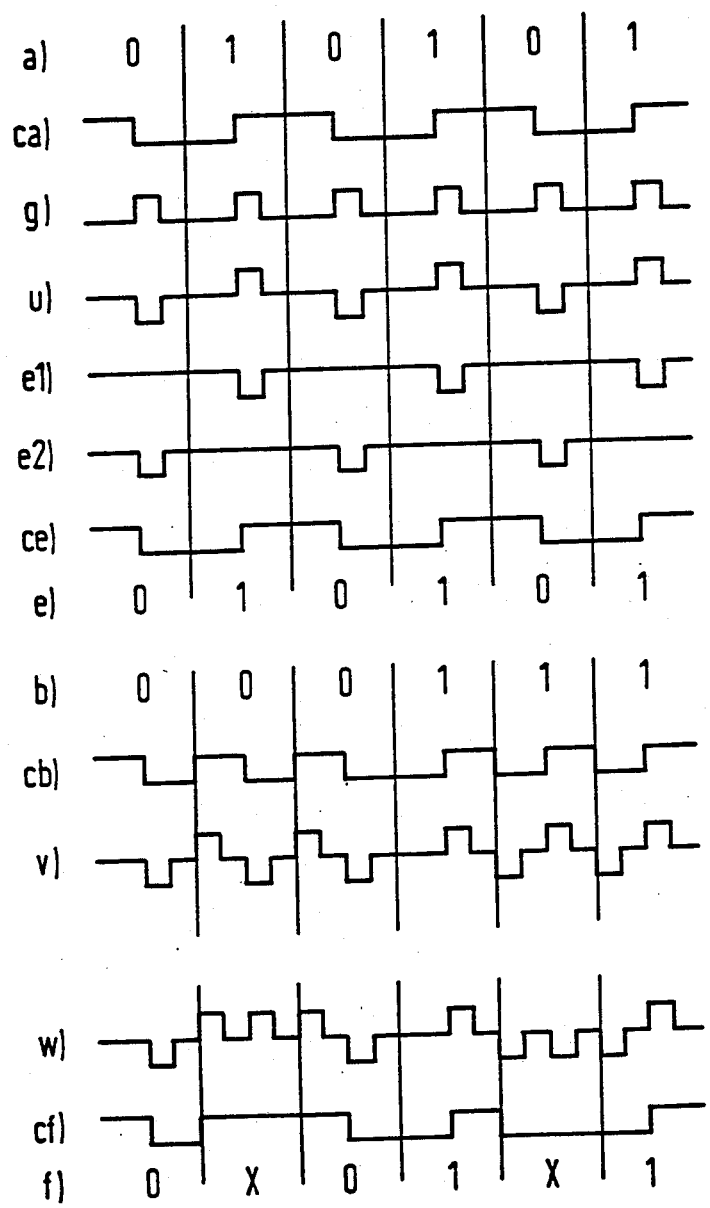
FIG. 4 illustrates signal statuses of the circuit of the present invention.

After every level transmission of the transmission data coming from the output ca of the LAN controller LANC, as indicated in FIG. 4 (ca) proceeding, for example, from a bit sequence specified in FIG. 4 (a), an unlocking input 20 of the difference bus transmitter S is supplied with an unlocking pulse about 250 ns long for bit time spans of, for example, 1μs, supplied from the one or from the other monostable circuit MK, whereby FIG. 4 (g) shows a sequence of such unlocking pulses. In response to transmission data according to FIG. 4 (ca) supplied to it at its transmission data input 18 and present in Manchester Code in the example, every difference bus transmitter S11, S12, S21, S22 then generates corresponding positive or, respectively, negative difference voltage pulses u (see FIG. 3) as shown in FIG. 4 (u). Dependent on their respective operational sign, the difference voltage pulses are accepted by the one or, respectively, by the other difference bus receiver (E1 or, respectively E2 in FIG. 3) at the reception side in every subscriber station T1n (in FIG. 1) of the bus system, as shown in FIG. 4 (e1) and FIG. 4 (e2). The RS flip-flop set or, respectively, reset by the output signals of the two difference bus receivers E1, E2 then restores the original data form therefrom, as may be seen in FIG. 4 (ce) and FIG. 4 (e).

Between two successive difference voltage pulses u (in FIG. 4 u), the difference bus transmitters S11, S12, S21, S22 of a subscriber station T1n (in FIG. 1 and FIG. 3) are in their quiescent condition of high internal resistance. This quiescent condition lasts about 250 ns or 750 ns in the example dependent on the equality or inequality of successive bits. When, in a collision case, difference voltage pulses sent by another subscriber station T1n (in FIG. 1) appear on the bus system L in these pulse gaps of the transmission equipment S (in FIG. 3) of a subscriber station T1n (in FIG. 3) now under consideration, then these difference voltage pulses are also accepted by the one or other difference bus receiver E1, E2 (in FIG. 3) of the subscriber station T1n (in FIG. 3) now being considered, with the result that the RS flip-flop K receives additional set or, respectively, reset pulses, so that falsifications of the data at the reception data input (ce) of the LAN controller LANC arise. Thus, for example, for data represented in Manchester Code, bit cells appear wherein the level transition in the middle significant bit cell for the Manchester Code is missing.

Let it be assumed that another subscriber station (T1n in FIG. 1) accesses the bus system L and feeds a different bit sequence onto the bus system simultaneously with the subscriber station T1n in FIG. 3, now being considered feeding the bit sequence recited in FIG. 4(a) and FIG. 4 (ca) onto the bus system L, as can be assumed to be presented, for example, in FIG. 4 (b) and FIG. 4 (cb). Consequently, this other subscriber station supplies the bus system with a correspondingly different difference voltage pulse sequence, as depicted in FIG. 4 (v) in the example. As a result, a difference voltage pulse sequence as indicated in FIG. 4 (w) and caused by overlaying of the difference voltage pulse sequences of the two subscriber stations accessing the bus system L in collision with one another then takes effect at the two difference line receivers (E1, E2) of the subscriber station T1n in FIG. 3. The illustration in FIG. 4 is based overall on a time equality of the bit cells of both subscriber stations established in the subscriber stations under consideration. Therefore appearing at the bi-stable flip-flop K following the two difference line receivers E1, E2 is a signal as depicted in FIG. 4 (cf) and, thus, a bit sequence as specified in FIG. 4 (f). Bit cells falsified due to collision are thereby referenced X in FIG. 4 (f), the collision of subscriber stations T1n (in FIG. 1) simultaneously accessing the bus system L can thus be identified with reference to these falsified bit cells.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim as my invention:

1. A transmission-reception equipment for a bus system having two signal conductors, having a difference bus transmission equipment connected respectively to the two signal conductors via difference outputs thereof and capable of two signal statuses, and having a difference bus reception equipment with two difference inputs connected respectively to the two signal conductors, having a repeater having a primary winding subdivided into first and second at least approximately identical halves and having a secondary winding having its two ends connected to the two signal conductors, respectively, having two ends of the two primary winding halves farthest opposed from one another connected to at least one difference bus receiver, and having a resistor connected between two adjacent center ends of the two primary winding halves, comprising the secondary winding having an at least approximately identical number of turns as the primary winding; two ends of the first primary winding half connected to two difference outputs of at least one first difference bus transmitter, two ends of the second primary winding half connected to two difference outputs of at least one second difference bust transmitter having its input side connected parallel to an input side of the first difference bus transmitter, and the value of resistance of said resistor being high in comparison to an output resistance of the bus line transmitters and low in comparison to an input resistance of the bus line receiver.

2. The transmission-reception equipment according to claim 1, wherein two first difference bus transmitters are connected parallel to one another t the input and output sides and two second difference bus transmitters are connected parallel to one another at the input and output sides.

3. The transmission-reception equipment according to claim 1, wherein the difference bus transmitters, respectively unlocked only for a fraction of a bit time span after every level transition of supplied transmission data and thereby outputing a positive or negative difference voltage pulse dependent on the new signal level, are provided at a transmission side, these difference bus transmitters being in a quiescent condition of high internal resistance during the remaining part of every bit time span; and wherein two difference line receivers are connected mutually opposite to those ends of the two primary winding halves farthest opposed from one another, a bi-stable RS flip-flop having its two inputs connected to the outputs of the two difference bus receivers, is provided at the reception side.

4. The transmission-reception equipment according to claim 3, wherein the difference bus transmitters are respectively unlocked only for about one-fourth of a bit time span and outputting a positive or negative difference voltage pulse and are in a quiescent condition of high internal resistance (tri-state condition) for about three-fourths of a bit time span.

5. The transmission-reception equipment according to claim 1, wherein a transmission data input of the difference bus transmitters are connected to a transmission data output of a local area networks controller and an output of the RS flip-flop is connected to a reception data input of the local area networks controller.

6. The transmission-reception equipment according to claim 1, wherein the difference bus transmitters, respectively unlocked only for a fraction of a bit time span after every level transition of supplied transmission data and thereby outputting a positive or negative difference voltage pulse dependent on the new signal level, are provided at a transmission side, these difference bus transmitters being in a quiescent condition of high internal resistance during the remaining part of every bit time span.

7. The transmission-reception equipment according to claim 1, wherein two difference line receivers are connected mutually opposite to those ends of the two primary winding halves farthest opposed from one another, a bi-stable RS flip-flop having its two inputs connected to the outputs of the two difference bus receivers, is provided at the reception side.

8. A transmission-reception equipment for a bus system having two signal conductors, having a difference bus transmission side connected to said conductors via difference outputs thereof and capable of two signal statuses, and having a difference bus reception side connected to the signal conductors via two difference inputs thereof, and having a repeater having a primary winding subdivided into two at least approximately identical halves and having a secondary winding, the secondary winding having two secondary ends connected to the two signal conductors, respectively, two ends of the two primary winding halves farthest opposed from one another connected to at least one difference bus receiver in the bus reception side and having a resistor connected between two adjacent center ends of the two primary winding halves, comprising:

the secondary winding having an at least approximately identical number of turns as the primary winding;

two ends of the first primary winding half connected to two difference outputs of at least one first difference bus transmitter in the bus transmission side;

two ends of the second primary winding half connected to two difference outputs of at least one second difference bus transmitter in the bust transmission side, said second difference bus transmitter having an input connected to an input of said first difference bus transmitter; and the value of resistance of said resistor being high in comparison to an output resistance of the bus transmission side and low in comparison to an input resistance of the bus reception side.

9. The transmission-reception equipment according to claim 8, wherein two first difference bus transmitters are connected parallel to one another at the input and output sides and two second difference bus transmitters are connected parallel to one another at the input and output sides.

10. The transmission-reception equipment according to claim 8 wherein the difference bus transmitters, respectively unlocked only for a fraction of a bit time span after every level transition of supplied transmission data and thereby outputting a positive or negative difference voltage pulse dependent on the new signal level, are provided at a transmission side, these difference bus transmitters being in a quiescent condition of high internal resistance during the remaining part of every bit time span; and wherein two difference line receivers are connected mutually opposite to those ends of the two primary winding halves farthest opposed from one another, a bi-stable RS flip-flop having its two inputs connected to the outputs of the two difference bus receivers, is provided at the reception side.

11. The transmission-reception equipment according to claim 10, wherein the difference bus transmitters are respectively unlocked only for about one-fourth of a bit time span and outputting a positive or negative difference voltage pulse and are in a quiescent condition of high internal resistance (tri-state condition) for about three fourths of a bit time span.

12. The transmission-reception equipment according to claim 8, wherein a transmission data input of the difference but transmitters are connected to a transmission data output of a local area networks controller and an output of the RS flip-flop is connected to a reception data input of the local area networks controller.

* * * * *